United States Patent
Gumpoltsberger et al.

(10) Patent No.: US 8,287,420 B2
(45) Date of Patent: Oct. 16, 2012

(54) MULTI-STAGE GEARBOX

(75) Inventors: Gerhard Gumpoltsberger, Friedrichshafen (DE); Martin Brehmer, Tettnang (DE); Peter Ziemer, Tettnang (DE); Peter Tiesler, Meckenbeuren (DE); Gabor Diosi, Friedrichshafen (DE); Josef Haupt, Tettnang (DE)

(73) Assignee: ZF Friedrichshafen, Friedrichshafen (DE)

( * ) Notice: Subject to any disclaimer, the term of this patent is extended or adjusted under 35 U.S.C. 154(b) by 126 days.

(21) Appl. No.: 13/056,480

(22) PCT Filed: Aug. 7, 2009

(86) PCT No.: PCT/EP2009/060274
§ 371 (c)(1),
(2), (4) Date: Jan. 28, 2011

(87) PCT Pub. No.: WO2010/018135
PCT Pub. Date: Feb. 18, 2010

(65) Prior Publication Data
US 2011/0183807 A1    Jul. 28, 2011

(30) Foreign Application Priority Data

Aug. 13, 2008   (DE) .................. 10 2008 041 205

(51) Int. Cl.
*F16H 3/62* (2006.01)
(52) U.S. Cl. ...................... 475/278; 475/903
(58) Field of Classification Search .................. 475/277, 475/278, 284, 903
See application file for complete search history.

(56) References Cited

U.S. PATENT DOCUMENTS

| 4,395,925 | A | 8/1983 | Gaus |
| 6,558,287 | B2 | 5/2003 | Hayabuchi et al. |
| 6,634,980 | B1 | 10/2003 | Ziemer |
| 6,960,149 | B2 | 11/2005 | Ziemer |
| 6,991,578 | B2 * | 1/2006 | Ziemer ......................... 475/296 |
| 7,549,942 | B2 | 6/2009 | Gumpoltsberger |
| 7,699,743 | B2 | 4/2010 | Diosi et al. |
| 8,231,496 | B2 * | 7/2012 | Gumpoltsberger et al. .. 475/275 |
| 2007/0202982 | A1 | 8/2007 | Gumpoltsberger |

FOREIGN PATENT DOCUMENTS

| DE | 29 36 969 A1 | 4/1981 |
| DE | 199 49 507 A1 | 4/2001 |
| DE | 101 15 995 A1 | 10/2002 |
| DE | 102 13 820 A1 | 10/2002 |
| DE | 10 2005 010 210 A1 | 9/2006 |
| DE | 10 2006 006 637 A1 | 9/2007 |
| DE | 10 2008 000 428 A1 | 9/2009 |
| JP | 2006-349153 A | 12/2006 |
| WO | 2009/106408 A1 | 9/2009 |

* cited by examiner

*Primary Examiner* — Ewin A Young
(74) *Attorney, Agent, or Firm* — Davis & Bujold, PLLC

(57) ABSTRACT

A transmission with forward and reverse gears comprising planetary gearsets, shafts and shift elements. The sun gear of gearset (P1) couples shaft (5) that is connectable, via brake (05), to housing (G). The carriers of gearsets (P1, P2) couple shaft (8) which is connectable, via clutch (18), to drive input shaft (1). Input shaft (1) is connectable, via clutches (16, 14), respectively to shafts (6, 4). Shaft (6) couples the ring gear of gearset (P3). Shaft (4) is connectable, via brake (04), to housing (G) and couples the sun gears of gearsets (P4, P3). The ring gears of gearsets (P1, P2) couple drive output shaft (2). The carrier of gearset (P3) couples shaft (7) which couples a component connecting the ring gear of gearset (P4) and the sun gear of gearset (P2). The carrier of gearset (P4) couples shaft (3) which is connectable, via brake (03), to housing (G).

14 Claims, 3 Drawing Sheets

| gear | engaged shifting elements | | | | | | i | phi |
|---|---|---|---|---|---|---|---|---|
| | 03 | 04 | 05 | 14 | 16 | 18 | | |
| 1. | × | | × | | × | | 4.95 | 1.59 |
| 2. | | × | × | | × | | 3.11 | 1.45 |
| 3. | | | × | × | × | | 2.14 | 1.47 |
| 4. | | | × | | × | × | 1.45 | 1.45 |
| 5. | | | | × | × | × | 1.00 | 1.21 |
| 6. | | × | | | × | × | 0.83 | 1.14 |
| 7. | × | | | | × | × | 0.73 | 1.21 |
| 8. | × | × | | | | × | 0.60 | 1.21 |
| 9. | × | | | × | | × | 0.50 | 10.0 |
| R. | × | | × | × | | | -4.06 | -0.82 |

MULTI-STAGE GEARBOX

This application is a National Stage completion of PCT/EP2009/060274 filed Aug. 7, 2009, which claims priority from German patent application serial No. 10 2008 041 205.8 filed Aug. 13, 2008.

FIELD OF THE INVENTION

The present invention concerns a multi-stage transmission of planetary design, in particular an automatic transmission for a motor vehicle.

BACKGROUND OF THE INVENTION

According to the prior art automatic transmissions, particularly those for motor vehicles, comprise planetary gearsets shifted by means of frictional or shift elements such as clutches and brakes, and are usually connected to a starting element that can operate with slip and is optionally provided with a bridging clutch, such as a hydrodynamic torque converter or a fluid clutch.

Such automatic transmissions are known for from DE 199 49 507 A1 by the present applicant, which describes a multi-stage transmission in which two non-shiftable upstream gearsets are provided on the transmission input shaft, which on their output side produce two speeds which, besides the speed of the drive input shaft, can be selectively engaged with a shiftable, double planetary gearset that acts upon the drive output shaft by selective engagement of the shift elements used, in such manner that to shift from one gear to the respective next-higher or next-lower gear, of the two shift elements actuated at the time in each case only one shift element has to be engaged or disengaged. Using five shift elements this enables seven forward gears to be produced, whereas if six shift elements are used, nine or ten forward gears can be obtained.

Furthermore, from DE 102 13 820 A1 a multi-stage automatic transmission with eight forward gears and one reverse gear is known, which comprises a first input path T1 of a first transmission gear ratio; an input path T2 which has a higher gear ratio than the input path T1; a planetary gearset of the Ravigneaux type with four elements, the four elements being a first element, a second element, a third element and a fourth element in the sequence of the elements in a speed diagram; a clutch C-2 which transmits rotation of the input path T2 to the first element S3; a clutch C-1 which transmits the rotation of the input path T2 to the fourth element S2; a clutch C-4 which transmits the rotation of the input path T1 to the first element; a clutch C-3 which transmits the rotation of the input path T1 to the second element C3; a brake B-1 which brings about the engagement of the fourth element; a brake B-2 which brings about the engagement of the second element; and a drive output element which is coupled to the third element S3.

Moreover, a 9-gear multi-stage transmission is known from DE 29 36 969 A1; it comprises eight shift elements and four gearsets, such that one gearset serves as an upstream transmission and the main transmission comprises a Simpson gearset and a further gearset that serves as a reversing gear.

Other multi-stage transmissions are known, for example from DE 102005010210 A1 and DE 102006006637 A1 by the present applicant.

In general automatically shifted vehicle transmissions of planetary design have often been described in the prior art and undergo constant further development and improvement. Such transmissions should take up little structural space, in particular having a small number of shift elements, and in sequential shift operations should avoid double shifts, so that when shifting in defined gear groups in each case only one shift element is changed.

From the as yet unpublished DE 102008000428.3 by the present applicant, a multi-stage transmission of planetary design is known, which comprises a drive input and a drive output arranged in a housing. In this known transmission are provided at least four planetary gearsets, called the first, second, third and fourth planetary gearsets in what follows, at least eight rotating shafts, called the drive input shaft, the drive output shaft and the third, fourth, fifth, sixth, seventh and eighth shafts, and at least six shift elements, including both brakes and clutches, whose selective engagement produces various transmission gear ratios between the drive input and the drive output, such that preferably nine forward gears and one reverse gear can be obtained.

In this case the first and second planetary gearsets, which are preferably designed as minus planetary gearsets, form a shiftable upstream gearset whereas the third and fourth planetary gearsets form a main gearset.

In this known multi-stage transmission it is provided that the carriers of the first and second planetary gearsets are coupled to one another by the fourth shaft, which is connected with an element of the main gearset, the ring gear of the first planetary gearset is coupled to the sun gear of the second planetary gearset by the eighth shaft, which can be releasably connected by means of a first clutch to the drive input shaft, and the sun gear of the first planetary gearset can be coupled, via the third shaft, by means of a first brake to a housing of the transmission and can be releasably connected by a second clutch to the drive input shaft, whereas the ring gear of the second planetary gearset can be coupled via the fifth shaft by means of a second brake to the housing of the transmission. Furthermore, the seventh shaft is permanently connected to at least one element of the main gearset and can be coupled by a third brake to the transmission housing, whereas the sixth shaft is permanently connected to at least one further element of the main gearset and can be connected releasably to the drive input shaft by a third clutch; the drive output shaft is connected permanently to at least one other element of the main gearset.

Preferably, in the known transmission the fourth shaft is permanently connected to the ring gear of the third planetary gearset, the sixth shaft is permanently connected to the ring gear of the fourth planetary gearset and to the carrier of the third planetary gearset, and can be connected releasably by means of the third clutch to the drive input shaft. In addition, the seventh shaft is connected permanently to the sun gears of the third and fourth planetary gearsets and can be coupled by means of the third brake to a housing of the transmission. In this case the drive output takes place via the drive output shaft connected permanently to the carrier of the fourth planetary gearset. Moreover, the third and fourth planetary gearsets can be combined or reduced to a Ravigneaux gearset with a common carrier and a common ring gear.

SUMMARY OF THE INVENTION

The purpose of the present invention is to propose a multi-stage transmission of the type mentioned at the start, which has nine forward gears and one reverse gear with a sufficient gear ratio, in which the structural complexity and size, in particular the overall length and weight are optimized and, in addition, the efficiency is improved in relation to drag and gearing losses. Furthermore, in the multi-stage transmission according to the invention low supporting torques should act upon the shift elements, and in particular the transmission according to the invention should be suitable for front transverse mounting.

Thus, according to the invention a multi-stage transmission of planetary design is proposed, which comprises a drive input and a drive output arranged in a housing. In addition there are provided at least four planetary gearsets, called the first, second, third and fourth planetary gearsets in what follows, such that the first planetary gearset is preferably designed as a plus planetary gearset and the other three planetary gearsets are minus planetary gearsets, as well as at least eight rotating shafts, called in what follows the drive input shaft, the drive output shaft and the third, fourth, fifth, sixth, seventh and eighth shafts, and at least six shift elements, including both brakes and clutches, whose selective engagement produces various transmission gear ratios between the drive input and the drive output, such that preferably nine forward gears and a reverse gear can be obtained. As is known, a simple minus planetary gearset comprises a sun gear, a ring gear and a carrier on which gearwheels are mounted to rotate, each of which meshes with the sun gear and the ring gear. Consequently, when the carrier is held steady the ring gear rotates in the opposite direction to the sun gear. In contrast, a simple plus planetary gearset comprises a sun gear, a ring gear and a carrier on which inner and outer planetary gearwheels are mounted to rotate, all the inner planetary gearwheels meshing with the sun gear and all the outer planetary gearwheels with the ring gear and each inner planetary gearwheel meshing with one respective outer planetary gearwheel. Consequently, when the carrier is held steady the ring gear rotates in the same direction as the sun gear.

According to the invention it is provided that the sun gear of the first planetary gearset is connected to the fifth shaft, which can be coupled by means of a first brake to the housing of the transmission, and the carrier of the first planetary gearset is connected to the eighth shaft, which is connected to the carrier of the second planetary gearset and can be connected releasably by a first clutch to the drive input shaft, whereas the drive input shaft can be connected releasably by means of a second clutch to the sixth shaft and by means of a third clutch to the fourth shaft. In this case the sixth shaft is connected to the ring gear of the third planetary gearset, whereas the fourth shaft can be coupled by means of a second brake to the housing of the transmission and is connected to the sun gear of the fourth planetary gearset and to the sun gear of the third planetary gearset.

Furthermore, the ring gear of the first planetary gearset is connected to the drive output shaft, which is connected to the ring gear of the second planetary gearset, whereas the carrier of the third planetary gearset is connected to the seventh shaft, which is connected to a component that connects the ring gear of the fourth planetary gearset and the sun gear of the second planetary gearset to one another. According to the invention the carrier of the fourth planetary gearset is connected to the third shaft, which can be coupled by a third brake to the housing of the transmission.

In a further development of the invention the first and second planetary gearsets are combined or reduced to a Ravigneaux gearset with a common carrier and a common ring gear.

By virtue of the design of the multi-stage transmission according to the invention gear ratios suitable in particular for passenger motor vehicles and a considerable increase of the overall spread of the multi-stage transmission are obtained, whereby the driving comfort is improved and fuel consumption is reduced significantly.

Moreover, since the number of shift elements in the multi-stage transmission according to the invention is small, the cost and structural complexity of the transmission are reduced considerably. Advantageously, with the multi-stage transmission according to the invention starting can be carried out with a hydrodynamic converter, an external starting clutch or with other suitable external starting elements. It is also conceivable to enable a starting process by means of a starting element integrated in the transmission. Preferably, a shift element which is actuated in the first forward gear and in the reverse gear is suitable for this.

In addition, the efficiency of the multi-stage transmission according to the invention in the main driving gears is good in relation to drag losses and gearing losses.

Furthermore, low torques are exerted in the shift elements and planetary gearsets of the multi-stage transmission and this advantageously reduces the wear in the multi-stage transmission. Moreover, since the torques are low the dimensions can be made correspondingly smaller, whereby the structural fitting space required and the costs are reduced. In addition, the rotation speeds of the shafts, shift element and planetary gearsets are low.

Besides, the transmission according to the invention is designed in such manner that it can be adapted to various drivetrain designs, both in the force flow direction and as regards space considerations.

BRIEF DESCRIPTION OF THE DRAWINGS

Below, examples of the invention are described in greater detail with reference to the attached drawings, which show.

DETAILED DESCRIPTION OF THE PREFERRED EMBODIMENTS

Figure 1:
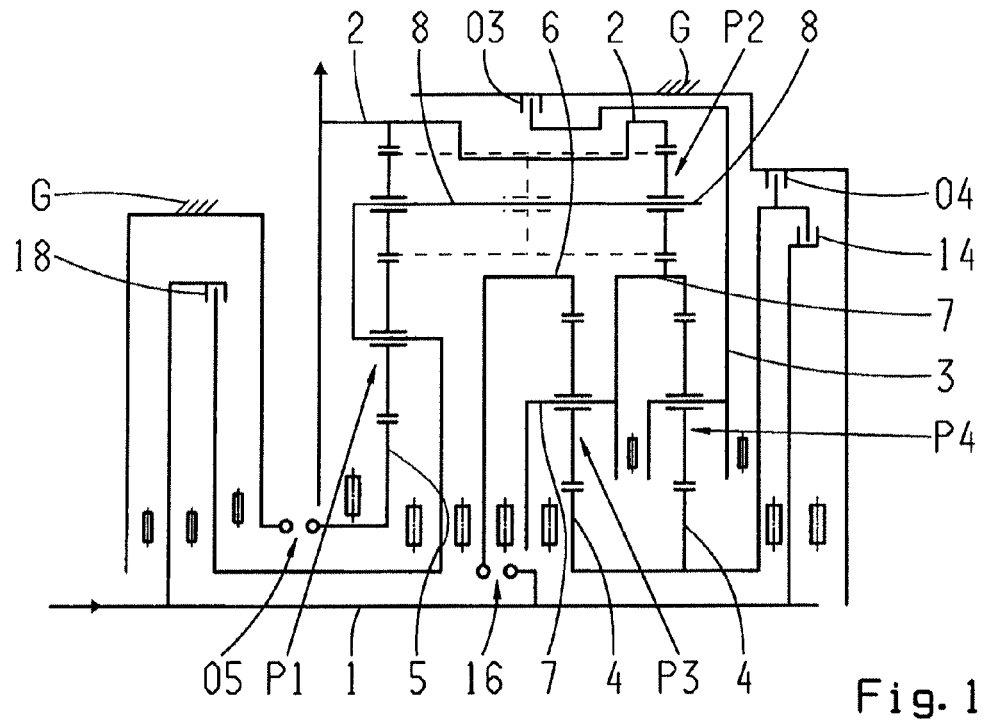
FIG. 1: Schematic view of a preferred embodiment of a multi-stage transmission according to the invention.

FIG. 1 represents a multi-stage transmission according to the invention, with a drive input shaft 1 and a drive output shaft 2 arranged in a housing G. Four planetary gearsets P1, P2, P3 and P4 are provided, such that that planetary gearsets P2, P3 and P4 are made as minus planetary gearsets whereas the planetary gearset P1 is a plus planetary gearset.

In the example embodiment shown in FIG. 1, which is particularly suitable for front transverse mounting, the second and fourth planetary gearsets P2, P4, viewed axially, are arranged in the same gearset plane with the second planetary gearset P2, viewed radially, arranged over the fourth planetary gearset P4, whereby the total of four planetary gearsets, viewed axially, are advantageously restricted spatially to three gearset planes. In this case the ring gear of the fourth planetary gearset P4 is connected by a component to the sun gear of the second planetary gearset P2. Viewed axially, the planetary gearsets are here arranged in the sequence P1, P3, P4/P2; the third planetary gearset P3 is arranged between the first planetary gearset P1 and the planetary gearsets P4/P2 arranged radially one over the other.

As can be seen from FIG. 1 six shift elements are provided, namely three brakes 03, 04, 05 and three clutches 14, 16 and 18. The shift elements can be arranged in any desired manner, limited only by their dimensions and external shape.

With these shift elements, nine forward gears and one reverse gear can be engaged selectively. The multi-stage transmission according to the invention has a total of eight rotating shafts, namely shafts 1, 2, 3, 4, 5, 6, 7 and 8, such that the first shaft is the drive input shaft and the second one is the drive output shaft of the transmission.

According to the invention, in the multi-stage transmission shown in FIG. 1 it is provided that the sun gear of the first planetary gearset P1 is connected to the fifth shaft 5 which can be coupled by means of a first brake 05 to the housing G of the transmission, the carrier of the first planetary gearset P1 is connected to the eighth shaft 8, which is connected to the carrier of the second planetary gearset P2 and can be connected releasably by means of a first clutch 18 to the drive input shaft 1, and the drive input shaft 1 can be connected releasably by a second clutch 16 to the sixth shaft 6 and by a third clutch 14 to the fourth shaft 4. In this case the sixth shaft 6 is connected to the ring gear of the third planetary gearset P3, whereas the fourth shaft 4 can be coupled by a second brake 04 to the transmission housing G and is connected to the sun gear of the fourth planetary gearset P4 and to the sun gear of the third planetary gearset P3.

In addition the ring gear of the first planetary gearset P1 is connected to the drive output shaft 2 which is connected to the ring gear of the second planetary gearset P2, whereas the carrier of the third planetary gearset P3 is connected to the seventh shaft 7, which is connected to the component which connects the ring gear of the fourth planetary gearset 4 and the sun gear of the second planetary gearset P2 to one another. According to the invention, the carrier of the fourth planetary gearset P4 is connected to the third shaft 3, which can be coupled by means of a third brake 03 to the housing G of the transmission.

In the example shown, as viewed in the force flow direction during traction operation the first clutch 18 is arranged before the first planetary gearset P1 whereas, again viewed in the force flow direction during traction operation, the first brake 05 is arranged before the first planetary gearset P1.

Furthermore, as viewed radially the third clutch 14 is arranged under the second brake 04 and, with the second brake 04, can have a common inner disk carrier. In addition, as viewed axially the second clutch 16 is arranged between the first planetary gearset P1 and the third planetary gearset P3.

Figure 2:
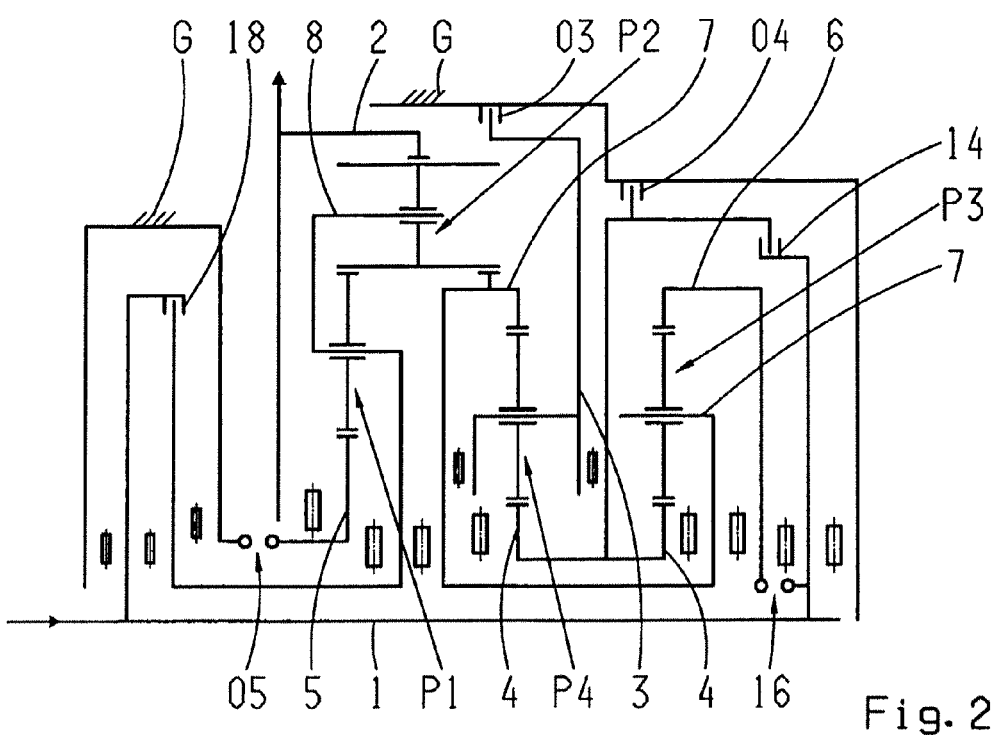
FIG. 2: Schematic view of another preferred embodiment of a multi-stage transmission.

The example shown in FIG. 2 differs from the example in FIG. 1, in that the first and second planetary gearsets P1, P2 are combined or reduced to a Ravigneaux gearset with a common carrier and a common ring gear, so that the third planetary gearset P3 is not arranged as in FIG. 1 between the first planetary gearset P1 and the planetary gearsets P4/P2 arranged radially one over the other; the planetary gearsets P4/P2 arranged radially one over the other are positioned between the first planetary gearset P1 and the third planetary gearset P3.

As can be seen from FIG. 2, as viewed in the force flow direction during traction operation the first clutch 18 is arranged before the first planetary gearset P1, and as viewed in the same way, the first brake 05 is arranged before the first planetary gearset P1.

In addition, as viewed radially the third clutch 14 is arranged under the second brake 04 and essentially above the third planetary gearset P3, and can have a common inner disk carrier with the second brake 04. Furthermore, as viewed radially the second clutch 16 can be arranged essentially under the third clutch 14, as also shown in FIG. 3; in that case, as viewed radially the second clutch 16 is arranged under the third clutch 14.

Figure 3:
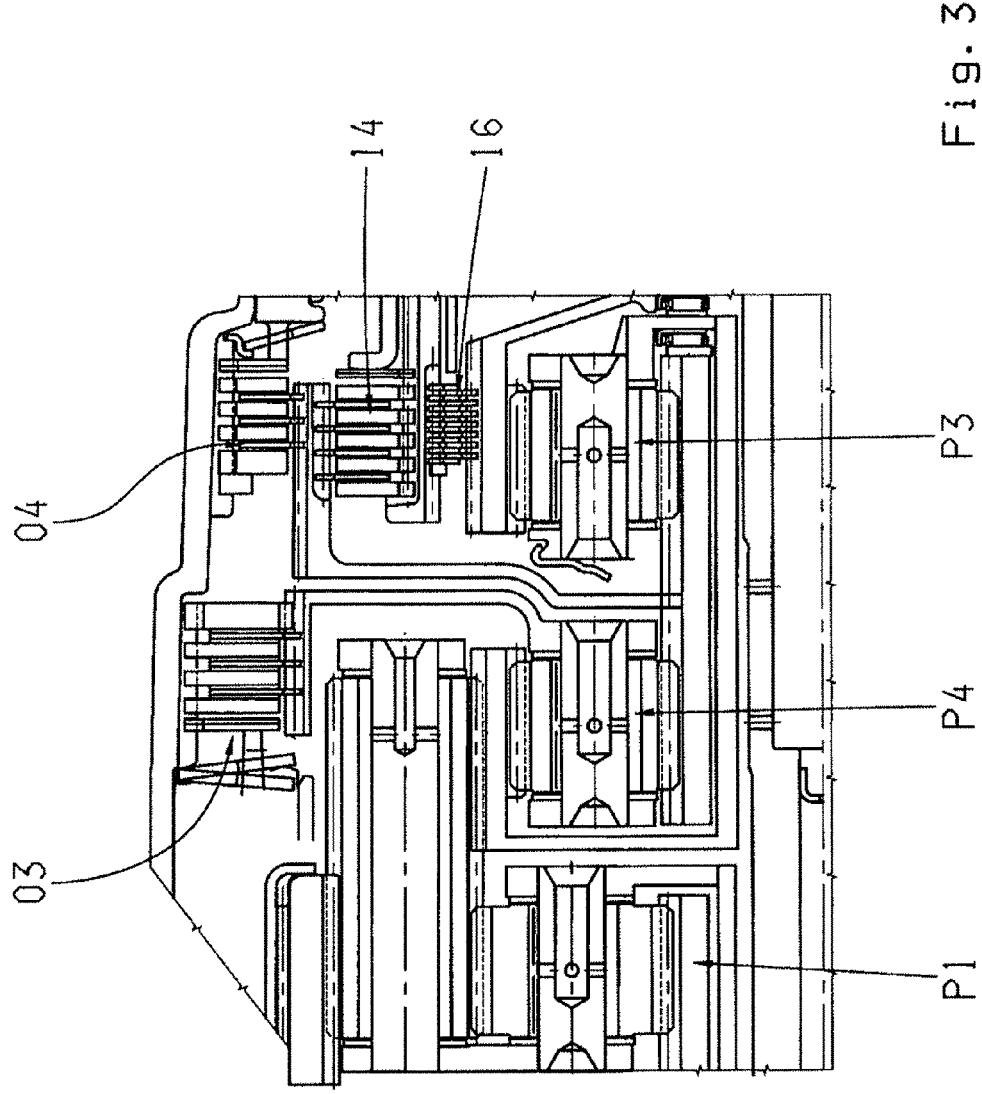
FIG. 3: Detailed view of the arrangement of the shift elements 04, 14, and 18 in a further embodiment of the invention.
Figures 4, 5:
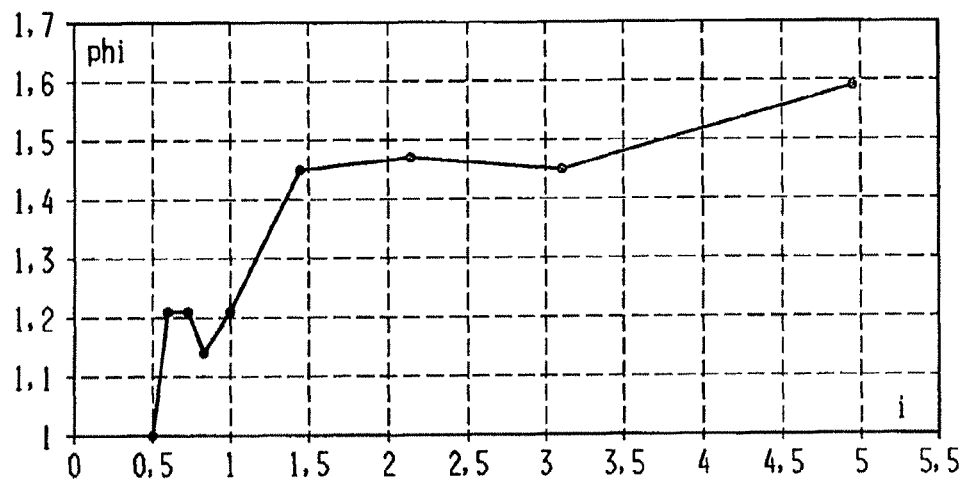
FIG. 4: Example of a shifting scheme for a multi-stage transmission according to FIGS. 1, 2 and 3.
FIG. 5: Diagram to make clear the gear interval phi corresponding to the respective gear ratio i of a gear, for the transmissions shown in FIGS. 1, 2 and 3.

FIG. 4 shows an example shifting scheme for a multi-stage transmission according to FIGS. 1, 2 and 3. For each gear three shift elements are engaged. As examples, from this shifting scheme the respective transmission gear ratios i of the individual gear steps and the gear intervals or step intervals phi to the next-higher gear determined from them can be seen, where the value 10.0 represents the ratio spread of the transmission.

Typical values for the fixed transmission ratios of the planetary gearsets P1, P2, P3 and P4 are, respectively, 3.20, −1.50, −2.20 and −1.90. From FIG. 4 it can be seen that during sequential shifting double shifts or group shifts are avoided, since two adjacent gear steps always use two shift elements in common. It can also be seen that a large spread with small gear intervals is achieved. Moreover, with the transmission shown in FIG. 1 a total of nine forward gears and one reverse gear can be obtained.

The first brake 05 and/or the second clutch 16 are preferably made as claw-type shift elements. This reduces the drag torques of the transmission produced due to the small separation between the friction surfaces of a frictional shift element in the disengaged condition and the oil or air-oil mixture present in the gaps. The other clutches 14, 18 and brakes 03, 04 are preferably made as frictional shift elements or disk-type shift elements.

The first forward gear is obtained by engaging the second clutch 16 and the third and first brakes 03, 05, the second forward gear by engaging the second and first brakes 04, 05 and the second clutch 16, the third by engaging the second and third clutches 14, 16 and the first brake 05, the fourth by engaging the first and second clutches 18, 16 and the first brake 05, the fifth by engaging the first, second and third clutches 18, 16 and 14, the sixth by engaging the second brake 04 and the first and second clutches 18, 16, the seventh forward gear by engaging the third brake 03 and the first and second clutches 18, 16, the eighth by engaging the third and second brakes 03, 04 and the first clutch 18, and the ninth forward gear by engaging the third brake 03 and the first and third clutches 18, 14. The reverse gear is obtained by engaging the third and first brakes 03, 05 and the third clutch 14.

Since the brakes 03 and 05 are engaged in both the first forward gear and the reverse gear, these shift elements (made as frictional or disk-type shift elements) can be used as starting elements.

According to the invention, even with the same transmission layout, depending on the shifting logic there can be different gear intervals, and this enables application-specific or vehicle-specific variation.

A diagram to show the step interval phi corresponding in each case to the gear ratio i of a gear for the transmission shown in FIGS. 1, 2 and 3, corresponding to the values shown in FIG. 4, is the object of FIG. 5.

According to the invention, additional freewheels can be provided at any suitable points of the multi-stage transmission, for example between a shaft and the housing or, if necessary, in order to connect two shafts.

According to the invention, an axle differential and/or a distributor differential can be arranged on the drive input side or on the drive output side.

In an advantageous further development the drive input shaft 1 can when necessary be disconnected from a drive motor by a clutch element, and as the clutch element a hydrodynamic converter, a hydraulic clutch, a dry-operating or wet-operating starting clutch, a magnetic powder clutch or a centrifugal force clutch can be used. It is also possible to arrange such a starting element behind the transmission in the force flow direction and in that case the drive input shaft 1 is connected permanently to the crankshaft of the engine.

The multi-stage transmission according to the invention also enables a torsional vibration damper to be arranged between the motor and the transmission.

In a further embodiment of the invention (not illustrated here) it is possible to arrange on any shaft, preferably on the drive input shaft 1 or the drive output shaft 2, a wear-free brake such as a hydraulic or electric retarder or the like, this being particularly important for use in utility motor vehicles. Furthermore an auxiliary drive can be provided on any shaft, preferably on the drive input shaft 1 or the drive output shaft 2, for powering additional aggregates.

The frictional shift elements used can be made as shift-under-load clutches or brakes. In particular, friction-force locking clutches or brakes such as disk clutches, band brakes and/or conical clutches can be used.

A further advantage of the multi-stage transmission described here is that an electric machine can be connected to any shaft as a generator and/or as an additional drive machine.

Needless to say, any design configurations and in particular any spatial arrangements of the planetary gearsets and shift elements, per se or relative to one another and provided they are technically appropriate, fall within the protective scope of the present claims without influencing the function of the transmission as indicated in the claims, even if such configurations are not represented explicitly in the figures or in the description.

Indexes
1 First shaft, drive input shaft
2 Second shaft, drive output shaft
3 Third shaft
4 Fourth shaft
5 Fifth shaft
6 Sixth shaft
7 Seventh shaft
8 Eighth shaft
03 Third brake
04 Second brake
05 First brake
14 Third clutch
16 Second clutch
18 First clutch
P1 First planetary gearset
P2 Second planetary gearset
P3 Third planetary gearset
P4 Fourth planetary gearset
i Transmission gear ratio
phi Gear interval
G Housing

The invention claimed is:

1. A multi-stage automatic transmission of a planetary design for a motor vehicle, the transmission comprising:
a drive input shaft (1) and a drive output shaft (2);
first, second, third and fourth planetary gearsets (P1, P2, P3, P4) arranged in a housing (G) of the transmission, each of the first planetary gearset (P1), the second planetary gearset (P2), the third planetary gearset (P3) and the fourth planetary gearset (P4) comprising a sun gear, a carrier and a ring gear;
at least third, fourth, fifth, sixth, seventh and eighth rotating shafts (3, 4, 5, 6, 7, 8);
six shift elements (03, 04, 05, 14, 16, 18) comprising first, second and third brakes (05, 04, 03) and first, second and third clutches (18, 16, 14) in which selective engagement thereof defines different transmission gear ratios between the drive input shaft (1) and the drive output shaft (2) so that nine forward gears and one reverse gear are implemented;
the sun gear of the first planetary gearset (P1) is connected to the fifth shaft (5) which is connectable, via the first brake (05), to the housing (G) of the transmission;
the carrier of the first planetary gearset (P1) is connected to the eighth shaft (8), which is connected to the carrier of the second planetary gearset (P2) and is connectable, via the first clutch (18), to the drive input shaft (1);
the drive input shaft (1) is connectable, via the second clutch (16), to the sixth shaft (6) and, via the third clutch (14), to the fourth shaft (4);
the sixth shaft (6) is connected to the ring gear of the third planetary gearset (P3);
the fourth shaft (4) is connectable, via the second brake (04), to the housing (G) of the transmission and is connected to the sun gear of the fourth planetary gearset (P4) and the sun gear of the third planetary gearset (P3);
the ring gear of the first planetary gearset (P1) is connected to the drive output shaft (2) which is connected to the ring gear of the second planetary gearset (2);
the carrier of the third planetary gearset (P3) is connected to the seventh shaft (7), which is connected to a component that connects the ring gear of the fourth planetary gearset (P4) and the sun gear of the second planetary gearset (P2) with one another; and
the carrier of the fourth planetary gearset (P4) is connected to the third shaft (3), which is connectable, via the third brake (03), to the housing (G) of the transmission.

2. The multi-stage transmission according to claim 1, wherein the second, the third and the fourth planetary gearsets (P2, P3, P4) are minus planetary gearsets and the first planetary gearset (P1) is a plus planetary gearset.

3. The multi-stage transmission according to claim 1, wherein when viewed axially, the second and the fourth planetary gearsets (P2, P4) are arranged in a common gearset plane, the second planetary gearset (P2), as viewed radially, is radially about the fourth planetary gearset (P4) so that the first, the second, the third and the fourth planetary gearsets (P1, P2, P3, P4), when viewed axially, are located substantially within three gearset planes.

4. The multi-stage transmission according to claim 1, wherein the first clutch (18) is arranged, in a force flow direction, before the first planetary gearset (P1).

5. The multi-stage transmission according to claim 1, wherein the first brake (05) is arranged, in a force flow direction, before the first planetary gearset (P1).

6. The multi-stage transmission according to claim 1, wherein the third clutch (14) is arranged radially inwardly of the second brake (04).

7. The multi-stage transmission according to claim 1, wherein the third clutch (14) and the second brake (04) have a common inner disk carrier.

8. The multi-stage transmission according to claim 1, wherein the third planetary gearset (P3) is arranged between the first planetary gearset (P1) and the fourth and the second planetary gearsets (P4, P2) with the second planetary gearset (P2) radially surrounding the fourth planetary gearset (P4).

9. The multi-stage transmission according to claim 8, wherein when viewed axially, the second clutch (16) is arranged axially between the first planetary gearset (P1) and the third planetary gearset (P3).

10. The multi-stage transmission according to claim 1, wherein the first planetary gearset (P1) and the second planetary gearset (P2) form a Ravigneaux gearset with a common carrier and a common ring gear, and the fourth and the second planetary gearsets (P4, P2) are arranged so that one radially surrounds the other and are arranged axially between the first planetary gearset (P1) and the third planetary gearset (P3).

11. The multi-stage transmission according to claim 10, wherein when viewed radially, the second clutch (16) is arranged radially inward of the third clutch (14).

12. The multi-stage transmission according to claim 1, wherein at least one of the first brake (05) and the second clutch (16) is a claw-type shift element, and the third and the fourth clutches (14, 18) and the second and the third brakes (03, 04) are frictional shift elements.

13. The multi-stage transmission according to claim 1, wherein:
   a first forward gear is achieved by engagement of the second clutch (16), the third brake (03) and the first brake (05);
   a second forward gear is achieved by engagement of the second brake (04), the first brake (05) and the second clutch (16);
   a third forward gear is achieved by engagement of the second clutch (16), the third clutch (14) and the first brake (05);
   a fourth forward gear is achieved by engagement of the first clutch (18), the second clutch (16) and the first brake (05);
   a fifth forward gear is achieved by engagement of the first clutch (18), the second clutch (16) and the third clutch (14);
   a sixth forward gear is achieved by engagement of the second brake (04), the first clutch (18) and the second clutch (16);
   a seventh forward gear is achieved by engagement of the third brake (03), the first clutch (18) and the second clutches (16);
   an eighth forward gear is achieved by engagement of the third brake (03), the second brake (04) and the first clutch (18);
   a ninth forward gear is achieved by engagement of the third brake (03), the first clutch (18) and the third clutch (14); and
   the reverse gear is achieved by engagement of the third brake (03), the first brake (05) and the third clutch (14).

14. The multi-stage transmission according to claim 1, wherein starting is carried out by engaging one of the third and the first brakes (03, 05) of the transmission.

* * * * *